(12) United States Patent
Snyder et al.

(10) Patent No.: US 11,993,358 B2
(45) Date of Patent: May 28, 2024

(54) MULTI-SPEED TRANSMISSIONS AND METHODS FOR SHIFTING MULTI-SPEED TRANSMISSIONS FOR MARINE VESSELS

(71) Applicant: Brunswick Corporation, Mettawa, IL (US)

(72) Inventors: Matthew W. Snyder, Fond du Lac, WI (US); Mitchell J. Baer, Fond du Lac, WI (US); David Van Buren, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 477 days.

(21) Appl. No.: 17/512,252

(22) Filed: Oct. 27, 2021

(65) Prior Publication Data

US 2022/0250729 A1   Aug. 11, 2022

Related U.S. Application Data

(60) Provisional application No. 63/147,971, filed on Feb. 10, 2021, provisional application No. 63/147,972, filed on Feb. 10, 2021.

(51) Int. Cl.
*B63H 23/06* (2006.01)
*B63H 23/30* (2006.01)
(Continued)

(52) U.S. Cl.
CPC ............. *B63H 23/06* (2013.01); *B63H 23/30* (2013.01); *F16H 59/68* (2013.01);
(Continued)

(58) Field of Classification Search
CPC ............... F16H 59/58; F16H 2059/683; F16H 2059/725; F16H 2061/0087;
(Continued)

(56) References Cited

U.S. PATENT DOCUMENTS 5,711,742 A  1/1998  Leinonen et al.
6,200,177 B1  3/2001  Scott et al.
(Continued)

OTHER PUBLICATIONS

U.S. Appl. No. 16/509,139 to Brett Bielefeld, filed Jul. 11, 2019.
(Continued)

*Primary Examiner* — Timothy Hannon
(74) *Attorney, Agent, or Firm* — Andrus Intellectual Property Law, LLP (57) ABSTRACT

A method for shifting a multi-speed transmission for transmitting rotation between an input shaft and an output shaft for a marine vessel. The method includes providing a multi-speed transmission having first and second gears engaged by actuating first and second clutches, and providing first and second pressure sensors that measure first and second pressures within the first and second clutches, respectively. The method further includes performing a first shift from the first gear to the second gear by de-actuating the first clutch a first delay after the second clutch is actuated, then measuring the first and second pressures and determining a first shift pressure at which the first and second pressures are substantially equal while performing the first shift. The method further includes comparing the first shift pressure to a first pressure threshold range and adjusting the first delay when the first shift pressure is outside the first pressure threshold range.

20 Claims, 8 Drawing Sheets

(51) Int. Cl.
  *F16H 59/68* (2006.01)
  *F16H 61/02* (2006.01)
  *F16H 61/08* (2006.01)
  *F16H 61/684* (2006.01)
  *F16H 59/72* (2006.01)
  *F16H 61/04* (2006.01)

(52) U.S. Cl.
  CPC ......... *F16H 61/0265* (2013.01); *F16H 61/08* (2013.01); *F16H 61/684* (2013.01); *F16H 2059/683* (2013.01); *F16H 2059/725* (2013.01); *F16H 2061/0459* (2013.01); *F16H 2200/0034* (2013.01); *F16H 2710/20* (2013.01)

(58) Field of Classification Search
  CPC ....... F16H 2061/0096; F16H 2061/064; F16H 2061/062; F16H 2061/0459; F16H 61/0204; F16H 61/0213; F16H 61/06; F16H 61/061; F16H 61/08; F16H 61/684; B63H 23/06; B63H 23/30
  See application file for complete search history.

(56) References Cited

U.S. PATENT DOCUMENTS

| | | | |
|---|---|---|---|
| 6,273,771 | B1 | 8/2001 | Buckley et al. |
| 9,446,829 | B1 | 9/2016 | Williams et al. |
| 9,676,463 | B1 | 6/2017 | Fortl et al. |
| 9,718,529 | B2 | 8/2017 | Williams et al. |
| 10,800,502 | B1 | 10/2020 | Alby et al. |
| 10,995,824 | B1 | 5/2021 | Bielefeld et al. |
| 11,358,698 | B1 * | 6/2022 | Snyder ................ F02D 41/0225 |

OTHER PUBLICATIONS

U.S. Appl. No. 16/733,825 to Matthew W. Snyder, filed Jan. 3, 2020.

* cited by examiner

MULTI-SPEED TRANSMISSIONS AND METHODS FOR SHIFTING MULTI-SPEED TRANSMISSIONS FOR MARINE VESSELS

CROSS REFERENCE TO RELATED APPLICATIONS

This application claims the benefit U.S. Provisional Patent Application Nos. 63/147,971 and 63/147,972, each filed Feb. 10, 2021, which are each incorporated herein by reference in their entireties.

FIELD

The present disclosure generally relates to shifting a transmission for a marine propulsion device, and more particularly to shifting a multispeed transmission.

BACKGROUND

The following U.S. patents and patent applications provide background information and are incorporated by reference in entirety.

U.S. Pat. No. 5,711,742 discloses a marine propulsion system, preferably having dual counterrotating propellers, which has an automatic multi-speed shifting mechanism such as a transmission. An electronic controller monitors engine parameters, such as engine revolution speed and load, and generates a control signal in response thereto, which is used to control shifting. Engine load is preferably monitored by sensing engine manifold air pressure.

U.S. Pat. No. 6,200,177 discloses a marine propulsion system which is provided with a gear shifting apparatus and method that changes a transmission from a low gear to a high gear, and vice versa, based solely on the engine speed. Engine speed is measured and a rate of change of engine speed is determined as a function of the actual change in engine speed over a measured time interval. Several threshold magnitudes are preselected and used to define one or more engine speed ranges. At least one threshold magnitude is used to compare the actual rate of change of engine speed to a preselected value. Both up shifting and down shifting of a transmission are controlled as a function of engine speed and rate of change of engine speed.

U.S. patent application Ser. No. 16/733,825 discloses a method for synchronizing shifting of transmissions across marine propulsion devices.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. patent application Ser. No. 16/509,139 and U.S. Pat. Nos. 9,446,829; 9,676,463; 9,718,529; 10,800,502; and 10,995,824 each generally relate to multi-speed transmissions and are also incorporated by reference herein in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a method for shifting a multi-speed transmission for transmitting rotation between an input shaft and an output shaft for a marine vessel. The method includes providing a multi-speed transmission having first and second gears engaged by actuating first and second clutches, and providing first and second pressure sensors that measure first and second pressures within the first and second clutches, respectively. The method further includes performing a first shift from the first gear to the second gear by de-actuating the first clutch a first delay after the second clutch is actuated, then measuring the first and second pressures and determining a first shift pressure at which the first and second pressures are substantially equal while performing the first shift. The method further includes comparing the first shift pressure to a first pressure threshold range and adjusting the first delay when the first shift pressure is outside the first pressure threshold range.

Another embodiment generally relates to another method for making a multi-speed transmission for transmitting rotation from an input shaft to an output shaft for a marine vessel. In addition to that stated above, this method further includes configuring a controller to control actuation of the first and second clutches such that a first shift from the first gear to the second gear is performed by actuating the second clutch and, after a first delay, de-actuating the first clutch, and a second shift from the second gear to the first gear is performed by actuating the first clutch and, after a second delay, de-actuating the second clutch. The controller is further configured to receive the first and second pressures measured by the first and second pressure sensors, respectively, to determine a first shift pressure at which the first and second pressures are substantially equal while performing the first shift, and to determine a second shift pressure at which the first and second pressures are substantially equal while performing the second shift. The controller is further configured to access first and second pressure threshold ranges stored in the memory system, to compare the first shift pressure to the first pressure threshold range, to adjust the first delay when the first shift pressure is outside the first pressure threshold range, to compare the second shift pressure to the second pressure threshold range, and to adjust the second delay when the second shift pressure is outside the second pressure threshold range. The controller is further configured to determine the first shift pressure every time the multi-speed transmission shifts from the first gear to the second gear, and to determine the second shift pressure every time the multi-speed transmission shifts from the second gear to the first gear. At a given rotation of the input shaft, the first gear causes the output shaft to rotate in a first direction at a first rotational speed and the second gear causes the output shaft to rotate in the first direction at a second rotational speed that is faster than the first rotational speed.

Another embodiment generally relates to a multi-speed transmission for a marine vessel, the multi-speed transmission including first and second gears each engageable to transmit rotation between an input shaft and an output shaft therethrough. First and second clutches are actuatable to engage the first and second gears, respectively. First and second pressure sensors measure first and second pressures within the first and second clutches, respectively. A memory system stores a first pressure threshold range. A controller controls actuation of the first and second clutches, where the controller is configured to perform a first shift from the first gear to the second gear by actuating the second clutch and, after a first delay, de-actuating the first clutch. The controller is further configured to receive the first and second pressures measured by the first and second pressure sensors, respectively, to determine a first shift pressure at which the first and second pressures are substantially equal while performing the first shift, to access the first pressure threshold range stored in the memory system, to compare the first shift pressure to the first pressure threshold range, and to adjust the first delay when the first shift pressure is outside the first pressure threshold range.

BRIEF DESCRIPTION OF THE DRAWINGS

The present disclosure is described with reference to the following drawings.

DETAILED DISCLOSURE

Figure 1:
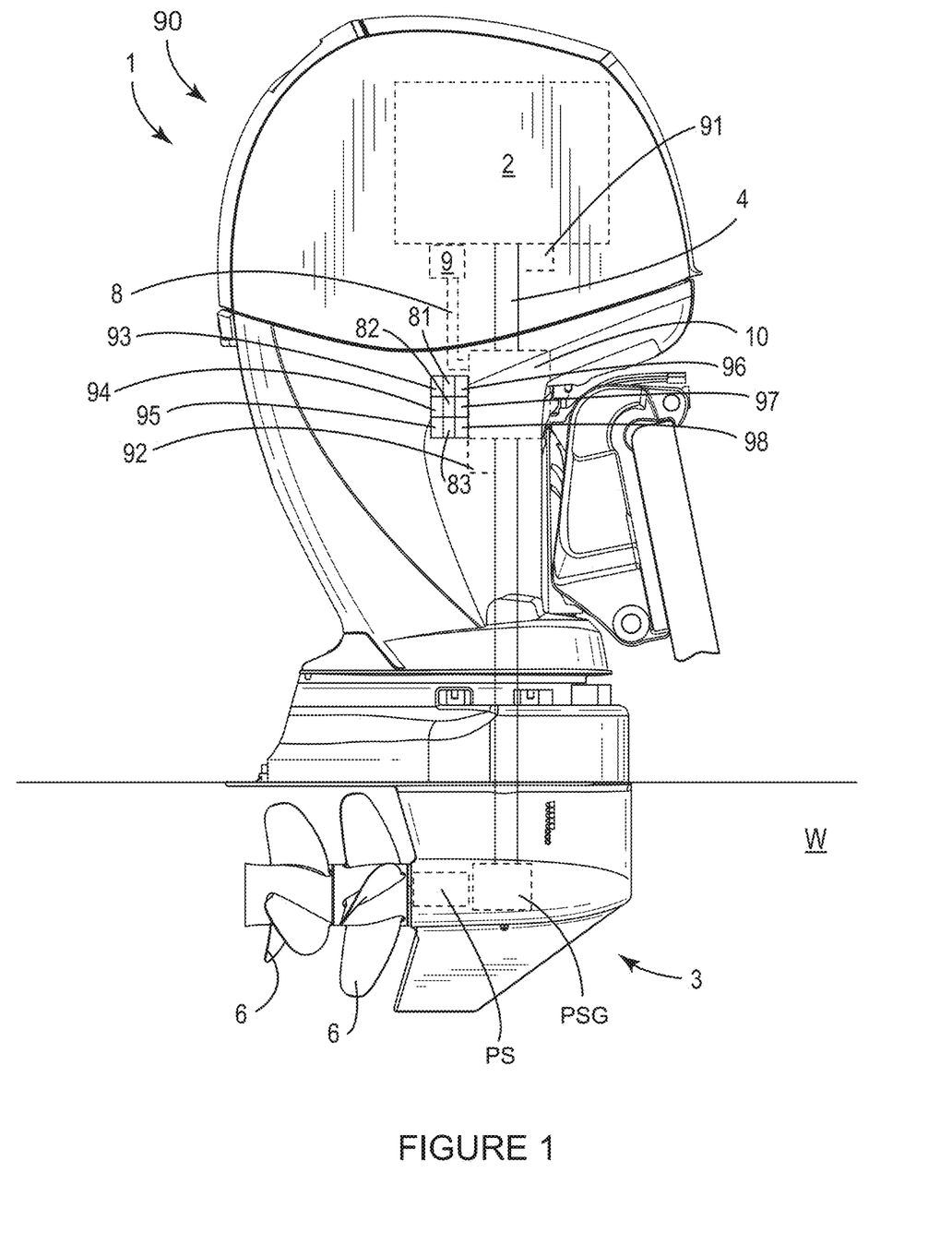
FIG. 1 is a side view of an exemplary marine propulsion device according to the present disclosure.

The present disclosure generally relates to systems and methods for shifting multi-speed transmissions (i.e., transmissions having more than one forward gear) used with marine propulsion devices. FIG. 1 depicts an exemplary propulsion device 1 incorporating the system 90 according to the present disclosure. The propulsion device 1 includes a powerhead 2 configured to rotate a driveshaft 4, which through a transmission 10 (discussed below), as well as propeller shaft gearsets PSG and propeller shafts PS contained within gearcase 3, are operational to rotate one or more propellers 6 to propel a vessel through the water W. Exemplary powerheads 2 include electric motors, internal combustion engines (e.g., gasoline or diesel engines), hybrids, or combinations thereof. An RPM sensor 91 is operatively coupled to the driveshaft 4 to detect an RPM of the driveshaft 4 in a manner known in the art. The transmission 10 is operable via a clutch actuator 8, which is controlled by a controller 9 to effectuate shifting within the transmission 10. For simplicity, a single clutch actuator 8 is referenced for controlling all clutches in the transmission 10, though it should be recognized that multiple individual clutch actuators may be used in practice. In the examples provided below, the clutches are hydraulically operated, whereby an electrical current provided by the controller 9 to the clutch actuator 8 causes the pressure of a fluid within a given clutch to increase until eventually causing that clutch to engage in a manner known in the art.

The following are examples of components that may be used in present or altered form for the presently disclosed systems and methods: Multidisc clutch packs presently used in pod drive engines, such as in Mercury Marine's® Zeus 3000 transmission part number 879148T69 or Mercury Marine's® ZF transmission part number ZF 105 S; a controller such as Mercury Marine® TVM part number 8M0079409 (also used with the Zeus 3000 transmission), and solenoid valves such as Bosch® DRE05SK. Other examples may also be taken from existing Mercury Marine® or other propulsion devices and/or are also be known in the art.

Figure 2:
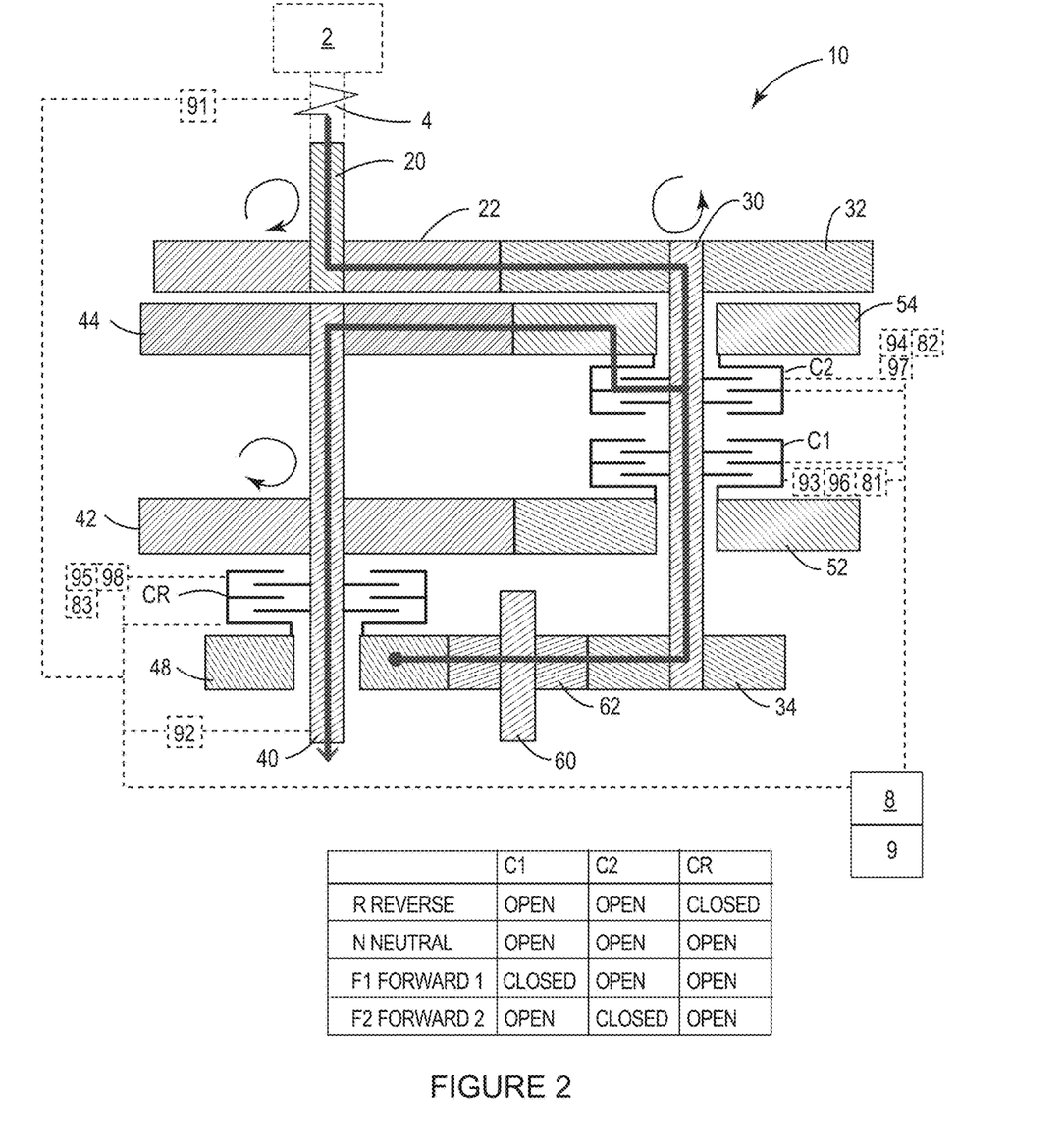
FIG. 2 is a schematic view of an exemplary transmission according to the present disclosure having two forward speeds.

FIG. 2 depicts a multi-speed transmission, here a transmission 10 having two speeds, according to the present disclosure. Additional information regarding transmissions can be found in SAE International's "Design Practices: Passenger Car Automatic Transmissions" (Fourth Edition, Product Code AE-29, 2012) and SAE International's "Dynamic Analysis and Control System Design of Automatic Transmissions" (2013), which are each incorporated by reference herein. While the present disclosure focuses primarily on transmissions having two forward speeds (also referred to as two-speed transmissions), it should be recognized that transmissions having more forward speeds are also applicable.

With continued reference to FIG. 2, the transmission 10 has an input shaft 20 that is configured to be coupled to the driveshaft 4 rotated by the powerhead 2. In this manner, the input shaft 20 is caused to rotate whenever the powerhead 2 is rotating the driveshaft 4. While the input shaft 20 is shown here to be physically connected to the driveshaft 4, it should be recognized that the transmission 10 may be positioned anywhere between the driveshaft 4 and the propeller shaft gearset PSG to translate rotatable power therebetween.

The input shaft 20 has an input gear 22 that is non-rotatably fixed thereto such that the input gear 22 and input shaft 20 rotate together. The input gear 22 meshes with a countershaft driven gear 32, which is non-rotatably fixed to a countershaft 30. In this manner, the input shaft 20 and the countershaft 30 are configured to rotate in opposite directions. A reverse driving gear 34 is also non-rotatably fixed to the countershaft 30 such that the reverse driving gear 34 also rotates in a direction opposite of the input shaft 20. In the embodiment shown, the countershaft 30 is parallel to the input shaft 20.

The transmission 10 further includes an output shaft 40 having a first driven gear 42 and also a second driven gear 44 that are each non-rotatably fixed thereto. The first driven gear 42 meshes with a first driving gear 52 that is selectively engageable with the countershaft 30 via a first clutch C1. Similarly, the second driven gear 44 meshes with a second driving gear 54 that, similarly to the first driving gear 52, is selectively engageable with the countershaft 30 via a second clutch C2. When the first clutch C1 is engaged, the first driving gear 52 is caused to rotate by the countershaft 30. Similarly, when the second clutch C2 is engaged, the second driving gear 54 is caused to rotate by the countershaft 30. A transmission output shaft speed (TOSS) sensor 92 is operatively coupled to the output shaft 40 of the transmission 10 to measure an RPM of the output shaft 40 in a manner known in the art.

With continued reference to FIG. 2, the first clutch C1 and second clutch C2 may be selectively engaged via actuation by the clutch actuators 8, which may include mechanical and/or electronic means for engagement of the clutches. It should be recognized that there may be a time lag between actuating a clutch and that clutch engaging to transfer rotational power between gears and shafts, for example. Additional information regarding the controller 9 for operating the transmission 10 is provide below (which, for example, may be the control system CS100 of FIG. 6).

The transmission 10 of FIG. 2 includes a reverse idler gear 62 that is supported by and rotates with a reverse idler shaft 60. The reverse idler gear 62 meshes with the reverse driving gear 34 coupled to the countershaft 30. The reverse idler gear 62 further meshes with a reverse driven gear 48 that is selectively engageable with the output shaft 40 by a reverse clutch CR. The reverse clutch CR is also operable through use of the clutch actuator 8 in the manner previously described for the first clutch C1 and second clutch C2.

In this manner, the first clutch C1 selectively rotates the first driving gear 52 with the countershaft 30, the second clutch C2 selectively rotates the second driving gear 54 with the countershaft 30, and the reverse clutch CR selectively rotates the output shaft 40 with the reverse driven gear 48. By selectively engaging the first clutch C1, the second clutch C2, or the reverse clutch CR, the transmission 10 is shiftable between a first forward mode (also referred to as first gear F1) in which the output shaft 40 rotates in a forward direction at a first speed relative to a speed of the input shaft 20, a second forward mode (also referred to as second gear F2) with rotation of the output shaft 40 in the forward direction at a second speed relative to a speed of the input shaft 20 that is different than the first speed, and also a reverse mode (also referred to as reverse gear R) in which the output shaft 40 rotates in reverse rotation that is opposite of the forward direction (i.e., opposite the input shaft 20). The transmission 10 also has a neutral mode (also referred to as neutral N) in which rotation of the input shaft 20 does not cause rotation of the output shaft 40, which occurs here when none of the clutches are engaged.

FIG. 2 further incorporates a table showing the combination of engaged and disengaged clutches corresponding to each of the modes for operating the transmission 10. In the example shown, the first clutch C1 is closed (engaged) when in first gear F1 and open (disengaged) when in reverse R, in neutral N, or in second gear F2. Similarly, the second clutch C2 is closed only when in second gear F2, and the reverse clutch CR is closed only when in reverse R. The transmission 10 is in neutral N when none of the clutches are closed. In this manner, respective gear ratio differences between the first driving gear 52 and first driven gear 42, as compared to between the second driving gear 54 and the second driven gear 44, dictates the rotational speed of the output shaft 40 relative to the input shaft 20.

The system 90 of FIGS. 1-2 further includes additional sensors for shifting the transmission 10 according to the present disclosure. Among these are temperature sensors 81-83 that measure the temperature of the clutches (i.e., the first clutch C1, the second clutch C2, and the reverse clutch CR, respectively). In examples in which temperature sensors are used, a different number of temperature sensors may be present (e.g., one). The temperature sensor may be configured to monitor transmission fluid temperature, which can be used as a representation of the clutch temperature itself. The temperature sensors may be of a type presently known in the art, for example model number #AP63497 by Alliant Power. Each of these clutches is further provided with a corresponding current sensor 93-95 and pressure sensor 96-98, respectively. The current sensors 93-95 measure an electrical current through solenoid valves within the clutches in a manner known in the art. The controller 9, which may be a combination of hardware and software, then measures the electrical current through the solenoid valves and controls the solenoid valves such that the measured electrical current matches the commanded electrical current to control engagement and disengagement of the clutch in a manner known in the art. Likewise, the pressure sensors 96-98 measure an amount of pressure within each of the clutches, which varies based on the current delivered to each of the clutches to engage and disengage the clutch in a manner known in the art.

The present inventors have recognized that although incorporating a multi-speed transmission within a marine propulsion device can improve acceleration, efficiency, and general performance for propelling a marine vessel, further challenges arise from the need to shift between forward gears. Specifically, the present inventors have recognized a problem with the performance and the noise, vibration, and harshness (NVH) of the marine propulsion device 1 when upshifting from a first gear F1 to a second gear F2, as compared to shifting to or from neutral N. Shifting between forward gears is also referred to as "power shifting", in contrast to shifting between neutral and either the first gear F1 or reverse R. The present inventors have identified that these NVH problems arise in part from the additional demand on the marine propulsion device 1 during the power shift, as compared to going to or from neutral N. Specifically, the marine propulsion device 1 is typically stationary, slowing down, or operating at lower speeds (and thus experiencing relatively low drag forces) when transitioning into or out of neutral N. In contrast, shifting from first gear F1 to second gear F2 means that the vessel is underway and operating at sufficiently high speeds so as to benefit from upshifting to a second or higher gear.

The present inventors developed calibration and shifting protocols to smooth the transition of shifting gears (including for power shifts), which include instructions for specific timing and pressure targets for controlling the fluid within the clutches to disengage one gear and engage another. However, the present inventors have further recognized that the transition for a power shift is not consistent over all times, and also not consistent across different transmissions 10 (even within the same model). The shift from first gear F1 to second gear F2 is different for a first shifting instance than subsequent shifting instances for the same gear transition within an operation session or key cycle. Likewise, temperature, hydraulic fill levels, and the age or wear of components within the transmission 10 can impact the NVH during a power shift with systems and methods presently known in the art.

Through experimentation and development, the present inventors have recognized that a smooth power shift requires very accurate control of the hand-off (i.e., transition) between the first clutch C1 and the second clutch C2, which provides a positive operator experience and also prevents damage to the transmission 10. In particular, too much overlap in time for the first clutch C1 and the second clutch C2 being simultaneously engaged provides a good feeling, but will damage the clutches. In contrast, too little overlap in time for the first clutch C1 and the second clutch C2 being simultaneously engaged (also referred to as a clutch gap, or "underlap") causes unpleasant NVH, for example a "bang" sound and/or a jolt felt throughout the marine vessel. Providing just the right amount of overlap in the first clutch C1 and the second clutch C2 being simultaneously engaged provides an almost imperceivable shift for the operator, while also extending the life of the transmission 10.

Figure 3:
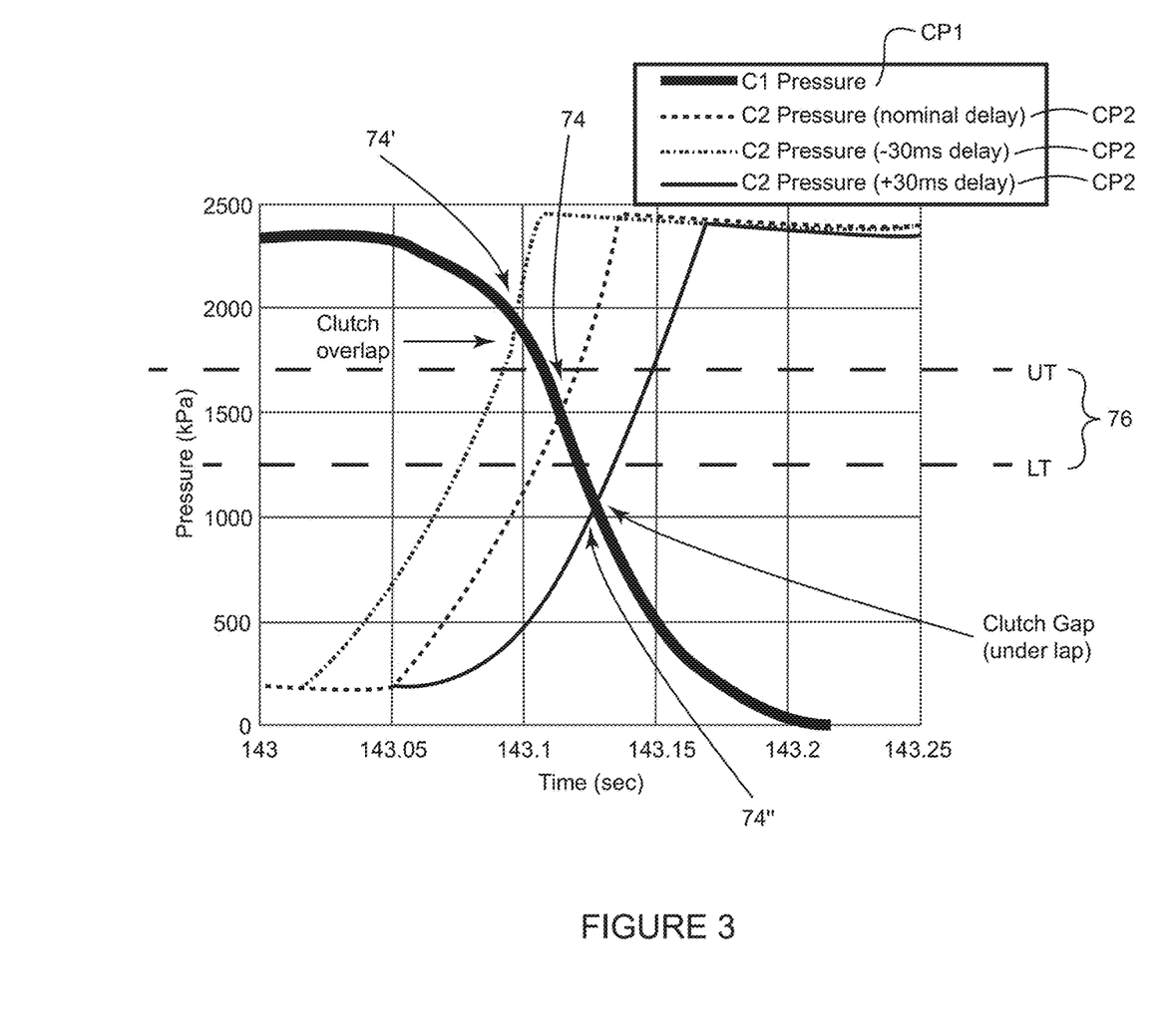
FIG. 3 is a graph depicting pressures for first and second clutches while shifting using different delays according to the present disclosure.

With reference to FIG. 3, the present inventors have further discovered that the right amount of overlap between the first clutch C1 and the second clutch C2 being simultaneously engaged can be achieved by controlling the pressure at which the corresponding clutch pressures intersect. In other words, a power shift occurs by increasing the pressure in one clutch to become engaged while decreasing the pressure of the other clutch to become disengaged, whereby these pressures eventually intersect. This intersection when the pressures of the clutches are substantially equal is also referred to herein as the "crossing pressure" 74, which may be measured via the pressure sensors 96-98 discussed above (FIG. 2).

It should be recognized that, based on the data collection (e.g., sampling) rates of the various sensors, there may not be data points corresponding to the pressures of the clutches being exactly equal. Moreover, the functionality of the presently disclosed methods and transmissions does not require these clutch pressures to be exactly equal, whereby being substantially equal yields is sufficient to perform as stated. As such, the present disclosure contemplates different methods for determining that these pressures are substantially equal (and thus, close enough to consider equal for the present purposes), including but not limited to:

Detecting the first set of data points at which the pressure of clutch 2 first exceeds the pressure of clutch 1 (e.g., during an upshift), then averaging the four data points corresponding to:
The pressure of clutch 1 one data point before the pressure of clutch 2 exceeds it
The pressure of clutch 1 when the pressure of clutch 2 first exceeds it
The pressure of clutch 2 one data point before it exceeds the pressure of clutch 1
The pressure of clutch 2 when it first exceeds the pressure of clutch 1
Whereby the average is then considered when the pressures of clutch 1 and clutch 2 are substantially equal,
Detecting the first set of data points at which the pressure of clutch 2 first exceeds the pressure of clutch 1 (e.g., during an upshift), then averaging the two data points corresponding to:
The pressure of clutch 1 when the pressure of clutch 2 first exceeds it
The pressure of clutch 2 when it first exceeds the pressure of clutch 1
Whereby the average is then considered when the pressures of clutch 1 and clutch 2 are substantially equal,
Determining that the pressures of clutch 1 and clutch 2 are within a given percentage of each other, for example within 20% or each other, within 20%, within 10%, within 5%, within 1% of each other, or at other values within 0-10%, for example (this too may be determined after detecting the first set of data points at which the pressure of clutch 2 first exceeds the pressure of clutch 1), and/or
Determining that the pressures of clutch 1 and clutch 2 are within a given value of each other, such as within 400 kPa of each other, within 300 kPa of each other, within 200 kPa of each other, within 100 kPa, within 50 kPa, within 10 kPa, or other values between 0 and 400 kPa, for example (this too may be determined after detecting the first set of data points at which the pressure of clutch 2 first exceeds the pressure of clutch 1).

The present inventors have discovered that there is a range of acceptable pressures for the crossing pressure 74 that provide good NVH characteristics and good performance and reliability for the transmission 10. As shown in FIG. 3, this acceptable pressure threshold range 76 may be defined between an upper threshold UT and lower threshold LT. In certain examples, the upper threshold UT and lower threshold LT are 1550 kPa and 1350 kPa, respectively. However, other values are also contemplated by the present disclosure, including an upper threshold UT of 1650 kPa and a lower threshold LT of 1300 kPa, or 1700 kPa and 1300 kPa, respectively, for example.

As shown in FIG. 3, a high crossing pressure 74' exceeding the upper threshold UT corresponds to excessive clutch overlap, while a low crossing pressure 74" below the lower threshold LT corresponds to clutch underlap. The experimental data of FIG. 3 shows a second clutch C2 being actuated, waiting a nominal delay, then de-actuating the first clutch C1, which here provides a crossing pressure 74 within the desired pressure threshold range 76. Actuating the second clutch C2 only 30 ms earlier than the nominal delay results in a high crossing pressure 74', while actuating the second clutch C2 only 30 ms later than the nominal delay results in a low crossing pressure 74". Accordingly, the present inventors have developed the systems and methods presently disclosed to provide for the accurate control needed to perform a power shift having a crossing pressure 74 within a desirable pressure threshold range 76.

Figure 4:
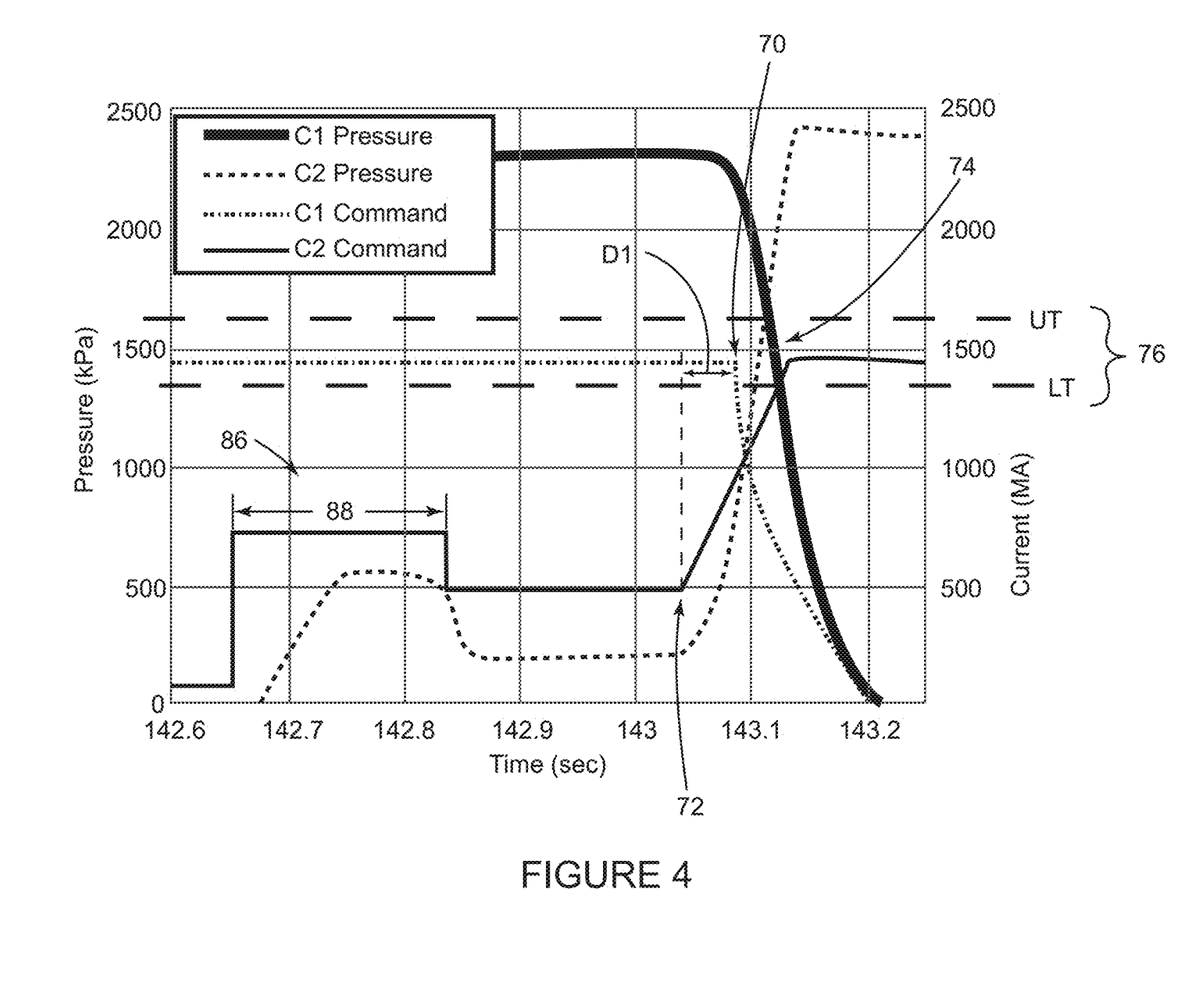
FIG. 4 is a graph depicting exemplary pressures for first and second clutches adjusting the delay during shifting according to the present disclosure.

FIG. 4 provides further experimental data for performing a power shift from first gear F1 to second gear F2 according to the present disclosure. In particular, FIG. 4 shows the first and second clutch pressures CP1, CP2 for both the first clutch C1 and the second clutch C2, respectively, as well as the first and second clutch currents CC1, CC2 delivered to each of the first clutch C1 and the second clutch C2, respectively. The pressures and currents may be measured using the pressure sensors 96-98 and current sensors 93-95 discussed above. In the example shown, a prefill procedure 86 is performed in a manner known in the art before either clutch is actuated or de-actuated to cause engagement or disengagement thereof, respectively (a process known as "pre-filling" the clutch). Additional information regarding pre-filling (and in some cases, pre-filling for wetting) the clutch can be found in U.S. Patent Application No. 63/147,971, to which the present disclosure claims priority.

In short, the prefill procedure 86 shown here includes providing a second clutch current CC2 to the second clutch C2 to increase the second clutch pressure CP2 therein for a predetermined prefill time 88. The second clutch pressure CP2 remains low enough to not engage the second clutch C2, but is high enough to pre-fill the second clutch C2 with hydraulic fluid such that when subsequent actuation of the second clutch C2 occurs, the second clutch C2 will engage without undue delay. This prefill procedure 86 may be especially important before the first occurrence of shifting after extended non-use, for example for the first engagement of the day (whereby the hydraulic fluid may have drained out of the clutch substantially more than in subsequent shifts). Following the prefill procedure 86, the second clutch pressure CP2 in the second clutch C2 may be allowed to decrease, but may remain above zero. The prefill procedure 86 is not required by the systems and methods presently disclosed, or in certain example may be bypassed for subsequent shifts (e.g., the clutch would already be wetted).

With continued reference to FIG. 4, once the pre-fill procedure 86 has been completed, the controller 9 (FIGS. 1-2) increases the second clutch current CC2 to the second clutch C2 at an actuation start 72, which may occur a predetermined time after commencing or completing the pre-determined prefill time 88, for example. When the second clutch pressure CP2 is sufficiently high, it should be recognized that the second clutch C2 will become engaged, which is monitored throughout the process using the pressure sensor 97 discussed above.

Figure 6:
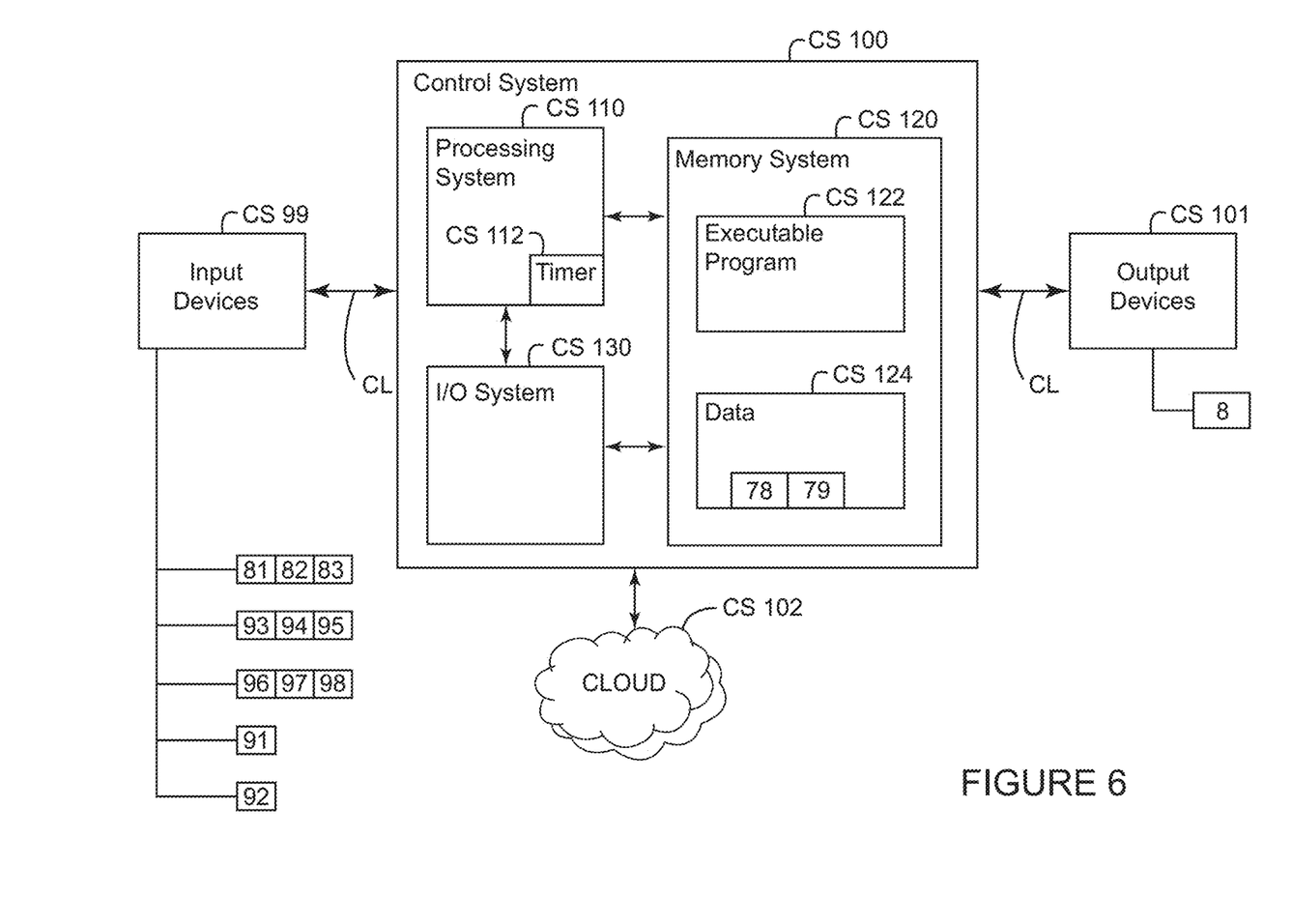
FIG. 6 is a schematic view of an exemplary control system for shifting a transmission according to the present disclosure.

It should be further recognized that completing the power shift to the second gear F2 further requires that the first clutch C1 be de-actuated and, consequently, disengaged (i.e., by reducing the first clutch current CC1). To ensure that the intended clutch overlap occurs, or in words that the crossing pressure 74 of the clutches occurs within the pressure threshold range 76, the presently disclosed systems and methods provide for a variable time for a de-actuation start 70 for de-actuating the first clutch C1. For a first shift from the first gear F1 to the second gear F2, the controller 9 (FIGS. 1-2) controls the first clutch C1 such that the de-actuation start 70 begins a first delay D1 after the actuation start 72 of the second clutch C2. The first delay D1 and others may be monitored using a timer 112 such as shown in FIG. 6, for example. The first delay D1 may be stored in memory as a nominal value, or as a previously calculated value. The first clutch pressure CP1 is also monitored throughout the process using the pressure sensor 96 discussed above.

Figure 5:
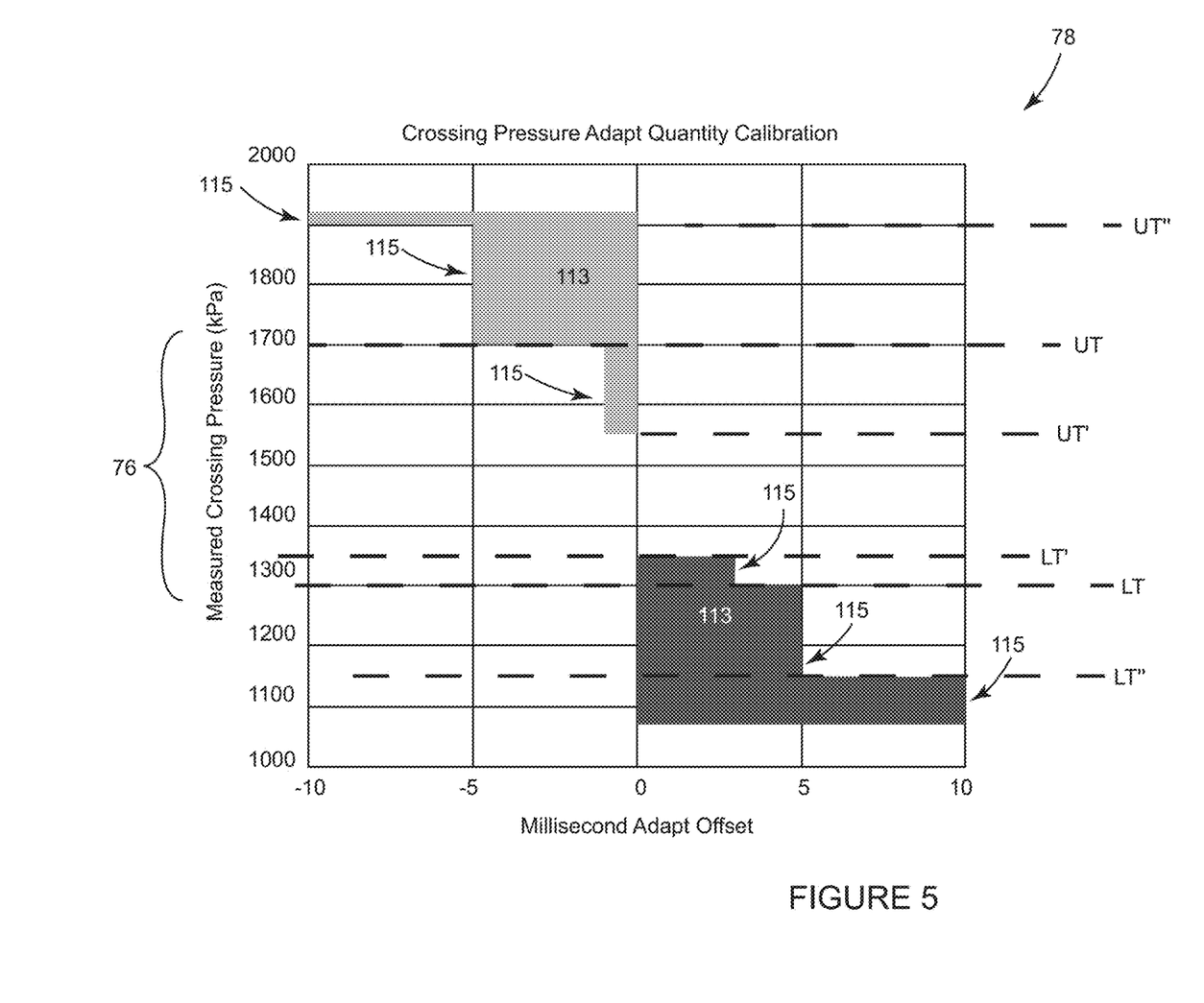
FIG. 5 is a graph depicting adjustments for the delay applied when shifting according to the present disclosure.

With reference to FIGS. 4 and 5, the controller 9 (FIGS. 1-2) then determines the crossing pressure 74 at which the falling first clutch pressure CP1 and the rising second clutch pressure CP2 intersect. This crossing pressure 74 is then compared to the pressure threshold range 76, which may also be stored in a memory system (discussed below), for example as the table 78 shown in FIG. 5. The table 78 of FIG. 5 includes the upper threshold UT and lower threshold LT defining the pressure threshold range 76 discussed above (shown here as 1550 kPa and 1300 kPa, respectively). In the example shown, the comparison of the crossing pressure 74 is a subtraction of the crossing pressure 74 from the upper threshold UT and the lower threshold LT to determine whether the crossing pressure 74 is within the pressure threshold range 76. However, it should be recognized that other methods for comparison are also contemplated by the present disclosure, as well as methods for defining the pressure threshold range 76. For example, the pressure threshold range 76 may be centered about a single pressure value (e.g, 1450 kPA) with the upper threshold UT and the lower threshold LT defined as a certain amount above and below this single pressure value (e.g., ±50 kPa). Alternatively, the upper threshold UT and the lower threshold LT may be provided as a percent deviation from the single pressure value, such as ±7%), for example.

With continued reference to FIG. 5, the controller 9 (FIGS. 1-2) then identifies which of the blocks 113 within the table 78 the determined crossing pressure 74 falls within, whereby the table 78 then provides a corresponding offset value 115 for adjusting the first delay D1. For example, when applying the pressure threshold range 76 that is between the upper threshold UT and the lower threshold LT, a crossing pressure 74 of 1800 kPa would correspond to an offset value 115 of −5 ms, whereas a crossing pressure 74 of 1100 kPa would correspond to an offset value 115 of +10 ms. The offset values 115 may accommodate for different rates of actuation and de-actuation of the clutches, based on the crossing pressures 74 thereof, which in certain examples are empirically derived.

The offset value 115 provided by reference to the table 78 is then added to the first delay D1 to yield a second delay D2. Subsequent power shifts are then performed as described above, but applying the second delay D2 after the actuation start 72 of the second clutch C2 before commanding the de-actuation start 70 of the first clutch C1, rather than the first delay D1 as shown in FIG. 4. The present inventors have further identified that not only do the rates of pressure changes vary by clutch, but also by whether that clutch is engaging versus disengaging. As such, each clutch may have its own offset value 115 for actuation and de-actuation, which may be stored in the same table 78 or separate tables, for example. The result is that the relative start times of actuating and de-actuating clutches for each power shift is offset or adjusted based on the performance of the power shift before it. In this manner, the crossing pressure 74 is continuously and automatically adjusted to remain effectively centered within the pressure threshold range 76 desired, despite variations between transmissions 10, temperatures, and/or the wear of parts over time.

The table 78 of FIG. 5 further shows examples of first and second alternate upper thresholds UT', UT", and first and second alternate lower thresholds LT', LT", respectively. These different upper and lower thresholds may be applied as a function to different types of transmissions 10, or as a function of other parameters such as temperature or time since startup, for example. In one example, the upper threshold UT and lower threshold LT are applied when the temperature sensors 81-83 measure temperatures within a first temperature range (e.g., between 30 and 60 degrees Celsius), whereas different upper and lower thresholds (e.g., first alternate upper threshold UT' and first alternate lower threshold LT') are applied when the temperature sensors 81-83 measure temperatures within a different temperature range (e.g., between 65 and 70 degrees Celsius).

In other examples, the same upper threshold UT and lower threshold LT are applied irrespective of the measurements of the temperature sensors 81-83, but the offset values 115 corresponding to the blocks 113 are further modified as a function of the readings of the temperature sensors 81-83. For example, temperature readings between 30 and 60 degrees Celsius may result in subtracting 10 ms from the offset values 115 currently shown in the table 78, whereas temperature readings between 65 and 70 degrees Celsius result in adding 15 ms to the offset values 115 currently shown in the table 78. In this manner, the delay between de-actuating one clutch and actuating another is continuously fine-tuned to ensure a desirable crossing pressure 74 for the next shifting event.

Additional information is now provided for the controller 9 shown in FIGS. 1-2, which may be configured like the control system CS100 of FIG. 6. Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

A person of ordinary skill in the art should understand in light of the disclosure that the control system CS100 may include a differing set of one or more control modules, or control devices, which may include engine control modules (ECMs) for each marine propulsion device 1 (which will be referred to as ECMs even if the marine propulsion device 1 contains an electric motor in addition to, or in place of, an internal combustion engine), one or more thrust vector control modules (TVMs), one or more helm control modules (HCMs), and/or the like. Additional information may be found in U.S. Patent Application Nos. 63/147,971 and 63/147,972, which have been incorporated herein as provided above.

In certain examples, the control system CS100 communicates with each of the one or more components of the system 90 via a communication link CL, which can be any wired or wireless link. The control system CS100 is capable of receiving information and/or controlling one or more operational characteristics of the system 90 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the system 90.

Moreover, the communication link CL lines are meant only to demonstrate that the various control elements are capable of communicating with one another, and do not represent actual wiring connections between the various elements, nor do they represent the only paths of communication between the elements. Additionally, the system 90 may incorporate various types of communication devices and systems, and thus the illustrated communication links CL may in fact represent various different types of wireless and/or wired data communication systems.

The control system CS100 may be a computing system that includes a processing system CS110, memory system CS120, and input/output (I/O) system CS130 for communicating with other devices, such as input devices CS99 and output devices CS101. Input devices CS99 may include the current sensors 93-95 and pressure sensors 96-98 associated with a first clutch C1, second clutch C2, and reverse clutch CR, respectively, the TOSS sensor 92, and the RPM sensor 91, for example (FIG. 1). Output devices CS101 may include the clutch actuator 8 for actuating the clutches, and/or the powerhead 2, for example.

The processing system CS110 loads and executes an executable program CS122 from the memory system CS120, accesses data CS124 stored within the memory system CS120, and directs the system 90 to operate as described in further detail below. A timer CS112 is also provided, shown here in conjunction with the processing system CS110, which is configured to count an elapsed time between starting and stopping of the timer CS112, for example.

The processing system CS110 may be implemented as a single microprocessor or other circuitry, or be distributed across multiple processing devices or sub-systems that cooperate to execute the executable program CS122 from the memory system CS120. Non-limiting examples of the processing system include general purpose central processing units, application specific processors, and logic devices.

The memory system CS120 may comprise any storage media readable by the processing system CS110 and capable of storing the executable program CS122 and/or data CS124. The memory system CS120 may be implemented as a single storage device, or be distributed across multiple storage devices or sub-systems that cooperate to store computer readable instructions, data structures, program modules, or other data. The memory system 120 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

Figure 7:
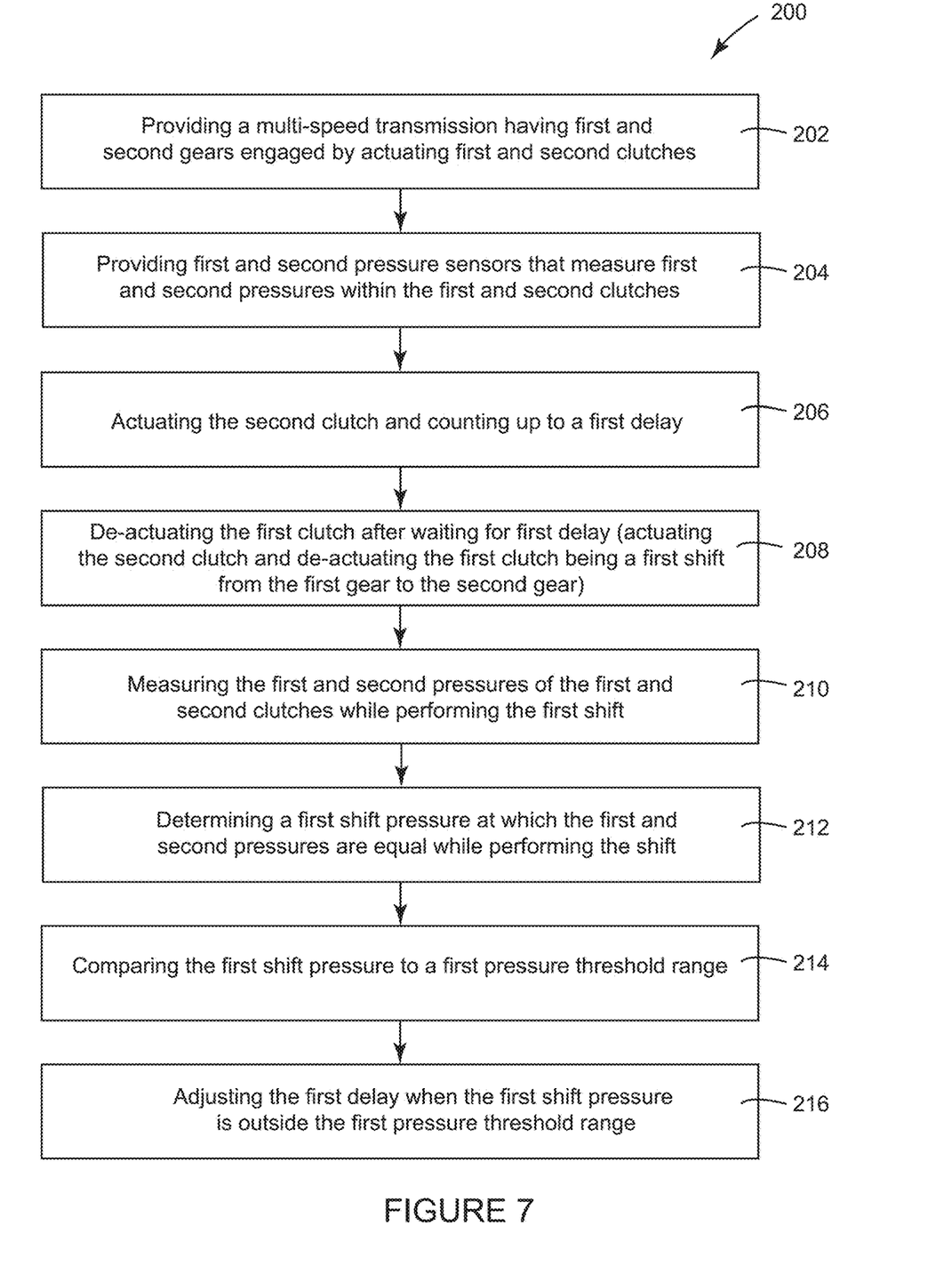
FIG. 7 is a process flow chart for an exemplary method of shifting a multi-speed transmission according to the present disclosure.

FIG. 7 depicts an exemplary method 200 for shifting a multi-speed transmission according to the present disclosure. Step 202 begins with providing a multi-speed transmission having first and second gears that are engaged by actuating first and second clutches, respectively. First and second pressure sensors are also provided in step 204, which measure first and second pressures within the first and second clutches, respectively, in a manner known in the art. Step 206 provides for performing a first shift from the first gear to the second gear by actuating the second clutch and counting up to a first delay. Next, step 208 then provides for de-actuating the first clutch after waiting for the first delay of Step 206.

Next, step 210 provides for measuring the first and second pressures (i.e., using the first and second pressure sensors) and determining in step 212 (e.g., via a controller such as the controller 9 discussed above) a first shift pressure at which the first and second pressures are substantially equal while performing the first shift. The first shift pressure was also described above as the crossing pressure 74, but here is specifically designated as the first shift pressure for later reference. Step 214 provides for comparing (e.g., via the controller) the first shift pressure to a first pressure threshold range and adjusting in step 216 the first delay when the first shift pressure is outside the first pressure threshold range. This step may be performed with reference to the table 78 discussed above, for example. In this manner, the crossing pressure is automatically adjusted to become, or remain, within the intended range of pressures to optimize NVH performance and longevity of the transmission.

Figure 8:
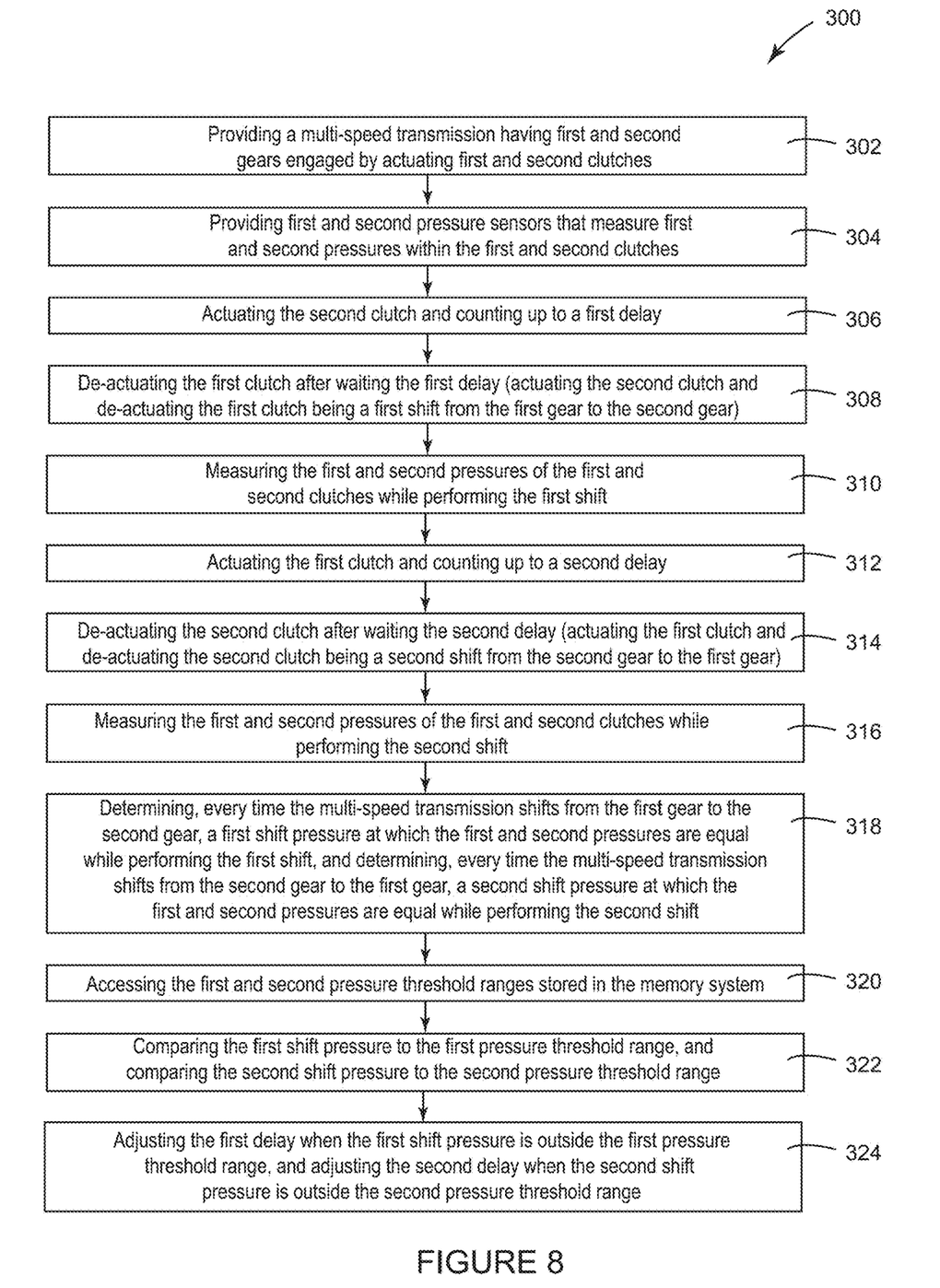
FIG. 8 is a process flow chart for another exemplary method of shifting a multi-speed transmission according to the present disclosure.

FIG. 8 depicts another exemplary method 300 for shifting a multi-speed transmission according to the present application, which here includes many of the steps of method 200. In particular steps 302 to 310 mirror those of steps 202 to 210. However, in addition to determining a first shift pressure and adjusting the first delay (as needed) for shifting from the first gear to the second gear, the method 300 provides for determining a second shift pressure and adjusting a second delay (as needed) for shifting from the second gear to the first gear. As discussed above, the characteristics of the transmission may result in different adjustments being needed to ensure smooth upshifting versus downshifting (which may also vary by particular gear if there are more than two forward gears).

In particular, step 312 provides for actuating the first clutch and counting up to a second delay, followed by de-actuating the second clutch after waiting the second delay in step 314. Step 316 proceeds similarly to step 310, but provides for measuring the first and second pressures of the first and second clutches while performing the second shift. Step 318 is similar to step 212, but provides for determining the second shift pressure in addition to the first shift pressure (and in this example, performs these determinations at every instance of shifting from first gear to second gear and second gear to first gear, which is not required in all embodiments). Steps 320 and 322 then provide for accessing the first and second pressure threshold ranges and comparing the first and second shift pressures thereto. Step 324 then proceeds similarly to step 216, but provides for adjusting the first and/or second delay when the corresponding first and/or second shift pressure are outside the first and/or second pressure threshold ranges.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method for shifting a multi-speed transmission for transmitting rotation between an input shaft and an output shaft for a marine vessel, the method comprising:
   providing a multi-speed transmission having first and second gears engaged by actuating first and second clutches, respectively;
   providing first and second pressure sensors that measure first and second pressures within the first and second clutches, respectively;
   performing a first shift from the first gear to the second gear by de-actuating the first clutch a first delay after the second clutch is actuated;
   measuring the first and second pressures and determining a first shift pressure at which the first and second pressures are substantially equal while performing the first shift; and
   comparing the first shift pressure to a first pressure threshold range and adjusting the first delay when the first shift pressure is outside the first pressure threshold range;
   wherein the multi-speed transmission transmits rotation from the input shaft to the output shaft via the first gear and the second gear based on the engagement thereof.

2. The method according to claim 1, wherein the first pressure threshold range extends between 1300 and 1700 kPa.

3. The method according to claim 1, further comprising providing a temperature sensor that measures a temperature of one of the first and second clutches, and further comprising further adjusting the first delay based on the temperature measured by the temperature sensor.

4. The method according to claim 3, further comprising a temperature range, wherein when the temperature exceeds the temperature range the first delay is adjusted to be longer than when the temperature is within the temperature range.

5. The method according to claim 1, wherein the first pressure threshold range comprises a lookup table, and wherein the first delay is adjustable in 5 ms increments.

6. The method according to claim 1, wherein the first shift pressure is determined every time the multi-speed transmission shifts from the first gear to the second gear.

7. The method according to claim 1, further comprising performing a second shift from the second gear to the first gear by de-actuating the second clutch a second delay after the first clutch is actuated, measuring the first and second pressures and determining a second shift pressure at which the first and second pressures are substantially equal while performing the second shift, and comparing the second shift pressure to a second pressure threshold range and adjusting the second delay when the second shift pressure is outside the second pressure threshold range.

8. The method according to claim 7, wherein at a given rotation of the input shaft the first gear causes the output shaft to rotate in a first direction at a first rotational speed and the second gear causes the output shaft to rotate in the first direction at a second rotational speed that is faster than the first rotational speed.

9. The method according to claim 7, wherein the first pressure threshold range and the second pressure threshold range are the same.

10. The method according to claim 1, further comprising prefilling the first clutch for a pre-determined prefill time before the first clutch is actuated, wherein the first time delay is also based on the pre-determined prefill time.

11. A multi-speed transmission for a marine vessel, the multi-speed transmission comprising:
    first and second gears each engageable to transmit rotation between an input shaft and an output shaft therethrough;
    first and second clutches actuatable to engage the first and second gears, respectively;
    first and second pressure sensors that measure first and second pressures within the first and second clutches, respectively; and
    a memory system storing a first pressure threshold range;
    a controller that controls actuation of the first and second clutches, wherein the controller is configured to perform a first shift from the first gear to the second gear by actuating the second clutch and, after a first delay, de-actuating the first clutch, and wherein the controller is further configured to:
      receive the first and second pressures measured by the first and second pressure sensors, respectively, and determine a first shift pressure at which the first and second pressures are substantially equal while performing the first shift;

access the first pressure threshold range stored in the memory system;

compare the first shift pressure to the first pressure threshold range; and adjust the first delay when the first shift pressure is outside the first pressure threshold range.

12. The multi-speed transmission according to claim 11, wherein the first pressure threshold range extends between 1300 and 1700 kPa.

13. The multi-speed transmission according to claim 11, further comprising a temperature sensor that measures a temperature of one of the first and second clutches, wherein the controller is further configured to adjust the first delay based on the temperature measured.

14. The multi-speed transmission according to claim 13, further comprising a temperature threshold range stored within the memory system, wherein when the temperature exceeds the temperature threshold range the first delay is adjusted to be longer than when the temperature is within the temperature threshold range.

15. The multi-speed transmission according to claim 11, wherein the first shift pressure is determined every time the multi-speed transmission shifts from the first gear to the second gear.

16. The multi-speed transmission according to claim 11, further comprising a second pressure threshold range stored in the memory system, wherein the controller is further configured to perform a second shift from the second gear to the first gear by actuating the first clutch and, after a second delay, de-actuating the second clutch, and wherein the controller is further configured to:

receive the first and second pressures measured by the first and second pressure sensors, respectively, and determine a second shift pressure at which the first and second pressures are substantially equal while performing the second shift;

access the second pressure threshold range stored in the memory system;

compare the second shift pressure to the second pressure threshold range; and adjust the second delay when the second shift pressure is outside the second pressure threshold range.

17. The multi-speed transmission according to claim 16, wherein at a given rotation of the input shaft the first gear causes the output shaft to rotate in a first direction at a first rotational speed and the second gear causes the output shaft to rotate in the first direction at a second rotational speed that is faster than the first rotational speed.

18. The multi-speed transmission according to claim 16, wherein the first pressure threshold range and the second pressure threshold range are the same.

19. The multi-speed transmission according to claim 11, wherein the controller is configured to prefill each of the first and second clutches for a prefill time before being actuated, and wherein the first time delay is also based on the prefill time for the second clutch.

20. A method for making a multi-speed transmission for transmitting rotation from an input shaft to an output shaft for a marine vessel, the method comprising:

providing first and second gears each engageable to transmit rotation from the input shaft to the output shaft;

providing first and second clutches actuatable to engage the first and second gears, respectively;

positioning first and second pressure sensors to measure first and second pressures within the first and second clutches, respectively; and configuring a controller to:

control actuation of the first and second clutches such that a first shift from the first gear to the second gear is performed by actuating the second clutch and, after a first delay, de-actuating the first clutch, and a second shift from the second gear to the first gear is performed by actuating the first clutch and, after a second delay, de-actuating the second clutch;

receive the first and second pressures measured by the first and second pressure sensors, respectively, determine a first shift pressure at which the first and second pressures are substantially equal while performing the first shift, and determine a second shift pressure at which the first and second pressures are substantially equal while performing the second shift;

access first and second pressure threshold ranges stored in the memory system; and compare the first shift pressure to the first pressure threshold range and adjust the first delay when the first shift pressure is outside the first pressure threshold range, and compare the second shift pressure to the second pressure threshold range and adjust the second delay when the second shift pressure is outside the second pressure threshold range;

wherein the controller is configured to determine the first shift pressure every time the multi-speed transmission shifts from the first gear to the second gear, and to determine the second shift pressure every time the multi-speed transmission shifts from the second gear to the first gear;

wherein at a given rotation of the input shaft the first gear causes the output shaft to rotate in a first direction at a first rotational speed and the second gear causes the output shaft to rotate in the first direction at a second rotational speed that is faster than the first rotational speed.

* * * * *